United States Patent
Wan et al.

(10) Patent No.: US 12,373,630 B2
(45) Date of Patent: Jul. 29, 2025

(54) SYSTEMS AND METHODS FOR DYNAMIC GENERATION OF DIGITAL DOCUMENTS

(71) Applicant: Bank of Montreal, Toronto (CA)

(72) Inventors: Ching Leong Wan, Toronto (CA); Stuart Robertson, Toronto (CA)

(73) Assignee: Bank of Montreal, Toronto (CA)

( * ) Notice: Subject to any disclaimer, the term of this patent is extended or adjusted under 35 U.S.C. 154(b) by 251 days.

(21) Appl. No.: 18/327,537

(22) Filed: Jun. 1, 2023

(65) Prior Publication Data

US 2023/0394220 A1    Dec. 7, 2023

Related U.S. Application Data

(60) Provisional application No. 63/348,352, filed on Jun. 2, 2022.

(51) Int. Cl.
*G06F 40/10* (2020.01)
*G06F 40/40* (2020.01)

(52) U.S. Cl.
CPC .................. *G06F 40/10* (2020.01)

(58) Field of Classification Search
CPC ........... G06F 9/453; G06F 40/40; G06F 40/10
See application file for complete search history.

(56) References Cited

U.S. PATENT DOCUMENTS

| | | | | |
|---|---|---|---|---|
| 7,703,010 | B2 * | 4/2010 | Bernstein | G06F 40/143 717/104 |
| 9,563,613 | B1 * | 2/2017 | Dinkel | G06F 40/186 |
| 2014/0355069 | A1 * | 12/2014 | Caton | H04N 1/00883 382/100 |
| 2017/0091612 | A1 * | 3/2017 | Gruber | G06F 3/0488 |
| 2020/0042316 | A1 * | 2/2020 | Roy | G06F 16/3338 |
| 2021/0089704 | A1 * | 3/2021 | Cotran | G06Q 10/101 |
| 2022/0382983 | A1 * | 12/2022 | Booth | G06F 40/284 |
| 2023/0325598 | A1 * | 10/2023 | Risuleo | G06F 40/143 704/9 |

* cited by examiner

*Primary Examiner* — Tadesse Hailu
(74) *Attorney, Agent, or Firm* — Foley & Lardner LLP

(57) ABSTRACT

Disclosed herein are methods and systems to retrieve and analyze data using customized machine-readable instructions. A method comprises identifying a set of computer-executable commands to satisfy an electronic request; identifying one or more dependencies within the set of computer-executable commands; generating a machine-readable instruction using at least a subset of the computer-executable commands in accordance with at least one dependency; and transmitting the machine-readable instruction to a second processor.

20 Claims, 12 Drawing Sheets

900

| | |
|---|---|
| GenerateAndESignDocs | Generate doc/s into Working Storage, store in Digital Library, upload to e-SignLive, start a signing session, wait until signing is completed, then download the signed package to Working Storage, store signed docs into Digital Library (as new versions of originals), and delete completed package from e-SignLive.<br><br>(using the appropriate atomic- and composite-commands) |
| PrintDocsFromDigitalLibrary | Retrieve doc/s from DL and place into Working Storage, then print them (i.e. GetDocsFromDigitalLibrary + PrintDocs). |
| SilentlySignDocsFromDigitalLibrary | Retrieve doc/s from DL and place into Working Storage, upload to e-SignLive, silently sign them, and download the completed package to Working Storage, and then delete the signed package from e-SignLive (i.e. GetDocsFromDigitalLibrary + UploadDocsToESignLive + SilentlySignPackage + DownloadSignedDocsFromESignLive + DeleteCompletedPkdFromESignLive). |
| GetDocsFromDigitalLibrary | Retrieve doc/s from DL and place into Working Storage. |
| StoreDocsInDigitalLibrary | Store doc/s currently in Working Storage into Digital Library. |
| CollectDataForDocGen | Collect data needed to generate docs and insert into Doc Gen DB. |
| GenerateDocs | Generate doc/s and place the generated docs into Working Storage. |
| PrintDocs | Print doc/s currently in Working Storage. |
| UploadDocsToESignLive | Upload doc/s currently in Working Storage to e-SignLive. |
| SilentlySignPackage | Silently sign an existing e-Sign package in e-SignLive. |
| DownloadSignedDocsFromESignLive | Download signed documents from e-SignLive to Working Storage. |
| DeleteCompletedPkgFromESignLive | Delete a completed e-sign package from e-SignLive. |
| SendDocsToTelusAssyst | Send doc/s currently in Working Storage to Telus Assyst as a zip file. |

FIG. 9

SYSTEMS AND METHODS FOR DYNAMIC GENERATION OF DIGITAL DOCUMENTS

CROSS-REFERENCE TO RELATED APPLICATIONS

This application claims priority to U.S. Provisional Patent Application No. 63/348,352, filed on Jun. 2, 2022, which is incorporated herein by reference in its entirety for all purposes.

TECHNICAL FIELD

This application relates generally to methods and systems for customized analysis of data.

BACKGROUND

An electronic request (e.g., generation of an electronic document) may require a server to communicate with and analyze data retrieved from multiple disparate data sources. Typically, conventional methods provide software solutions that use a static roadmap indicating how and with which data sources to communicate, what data needs to be retrieved, and how the retrieved data is to be analyzed to satisfy the electronic request. However, conventional methods and systems suffer from various technical problems. First, different data sources may not use compatible protocols, such as data formats or communication interfaces. For instance, in many organizations, different acquired computer ecosystems, data repositories, and software solutions may not be compatible with each other or components of the legacy computing ecosystem.

Second, revising a roadmap may be a time-consuming endeavor that requires high computing resources. Some of the data repositories indicated within a roadmap may have reached end-of-life status. In order to update the roadmap, conventional methods and systems may require manual classification, verification, or revision of the roadmap itself, which results in longer cycle times, poor customer experience, repetitive work, and inefficient allocation of resources. Also, a revision of the roadmap may require end-to-end testing to ensure its viability, which also requires high computing resources.

Third, as a result of using static roadmaps, conventional methods, and systems may also have limited on-premises storage capacity, which typically restricts the expansion of the digital libraries. This is because the amount of data (e.g., a limited number of documents or limited size of files) that can be generated in a single call function may be limited due to the synchronous passing of binary data between components.

SUMMARY

For the aforementioned reasons, there is a need for a computer-implemented system and method that enables secure and efficient retrieval and analysis of data. Embodiments disclosed herein address the above technical challenges by providing methods and systems to generate a modular, dynamic, and pluggable command pipeline (machine-readable instructions) with customized functionality that can be added, deleted, and/or revised without requiring existing components to be modified and thus retested (e.g., via end-to-end testing).

Embodiments disclosed herein also describe methods and systems to extract knowledge from the customized modular command pipelines and machine-learning instructions. Localizing knowledge within domain-defined bounds contexts may create technical efficiencies by reducing cross-team miscommunications, handoffs, and costs. Furthermore, more technical efficiencies may be created by creating a concrete database that provides a clear and unambiguous standard for data mapping (e.g., machine-readable instructions that retrieve and analyze data).

In an embodiment, a method for dynamic generation of digital documents comprises identifying, by a processor, a set of computer-executable commands to provide at least one digital document responsive to an electronic request, each computer-executable command configured to communicate with at least one data repository; identifying, by the processor, a plurality of dependencies within the set of computer-executable commands; generating, by the processor, a machine-readable instruction using at least a subset of the computer-executable commands arranged in a sequence corresponding to a subset of the plurality of dependencies; dynamically configuring, by the processor, an application programming interface in accordance with the machine-readable instruction, whereby the application programming interface transmits the subset of computer-executable commands in accordance with the sequence to a plurality of second processors each associated with the at least one data repository; and generating, by the processor, the at least one digital document using data received from the application programming interface.

In another embodiment, a computer system for dynamic generation of digital documents comprises a server comprising a processor and a non-transitory computer-readable medium containing instructions that when executed by the processor causes the processor to perform operations comprising identifying a set of computer-executable commands to provide at least one digital document responsive to an electronic request, each computer-executable command configured to communicate with at least one data repository; identifying a plurality of dependencies within the set of computer-executable commands; generating a machine-readable instruction using at least a subset of the computer-executable commands arranged in a sequence corresponding to a subset of the plurality of dependencies; dynamically configuring an application programming interface in accordance with the machine-readable instruction, whereby the application programming interface transmits the subset of computer-executable commands in accordance with the sequence to a plurality of second processors each associated with the at least one data repository; and generating the at least one digital document using data received from the application programming interface.

In yet another embodiment, a computer system for dynamic generation of digital documents comprises a server having at least one processor, the server configured to identifying a set of computer-executable commands to provide at least one digital document responsive to an electronic request, each computer-executable command configured to communicate with at least one data repository; identifying a plurality of dependencies within the set of computer-executable commands; generating a machine-readable instruction using at least a subset of the computer-executable commands arranged in a sequence corresponding to a subset of the plurality of dependencies; dynamically configuring an application programming interface in accordance with the machine-readable instruction, whereby the application programming interface transmits the subset of computer-executable commands in accordance with the sequence to a plurality of second processors each associated with the at least one data repository; and generating the at least one digital document using data received from the application programming interface.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIGS. 8-9 illustrate visual depictions of pre-configured computer-executable commands.

DETAILED DESCRIPTION

Figure 1A:
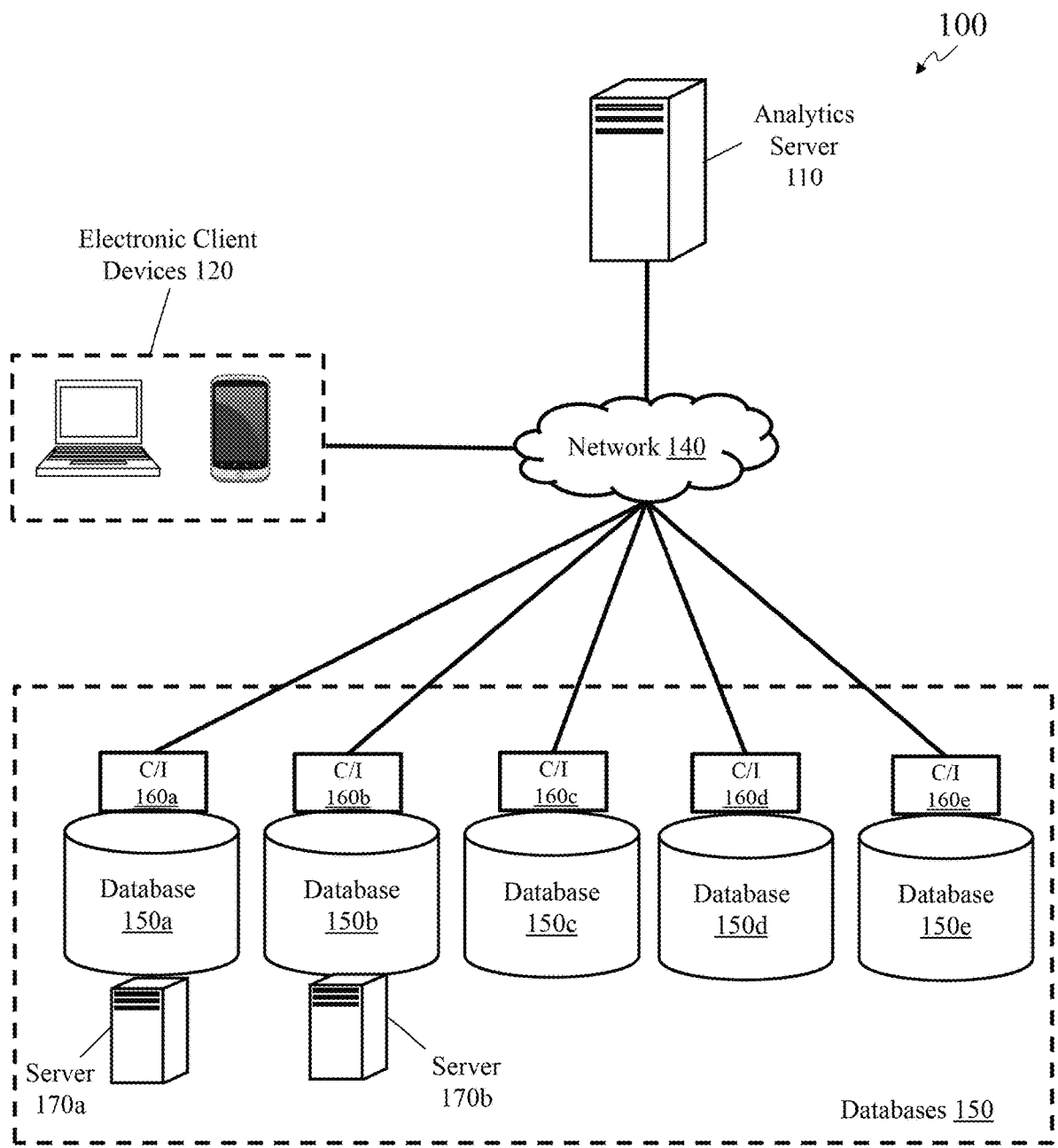
FIG. 1A illustrates a computer system for a dynamic generation of electronic documents, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 illustrates components of a system 100 for dynamic retrieval of data, according to an embodiment. The system 100 may comprise an analytics server 110, a set of electronic client devices 120, and a set of databases 150 (databases 150a-150e) each having its communication interface 160a-e (collectively communication interfaces 160). The features and components discussed herein and depicted in FIG. 1 may communicate with each other and with the analytics server 110 via hardware and software components of the network 140.

Even though in this disclosure, certain aspects of the systems and method disclosed herein are described in the context of storage and retrieval of trade data, it is expressly understood that, in other embodiments, the systems and methods described herein could be used for storage and retrieval of other data as well.

Examples of the network 140 include, but are not limited to, Local Area Networks (LAN), Wireless Local Area Networks (WLAN), Metropolitan Area Network (MAN), Wide Area Network (WAN), and the Internet. The communication over the network 140 may be performed in accordance with various communication protocols, such as Transmission Control Protocol and Internet Protocol (TCP/IP), User Datagram Protocol (UDP), and IEEE communication protocols. The network 140 may be private or public. For instance, network 140 may use private IP address space. Both the IPv4 and the IPv6 specifications define private addressing ranges. These private addresses may be commonly used for local area networks in residential, office, and enterprise environments. Private addresses may be commonly used in internal networks for security reasons. For example, private addresses that incorporate a network may be not accessible directly to the Internet for security reasons. A proxy, a gateway, or similar devices may provide restricted Internet access to internal networks. Because it is difficult for an Internet (external) host to connect directly to an internal system, private addresses may enhance network security for the internal system.

The set of electronic client devices 120 may be any computing device allowing a user to interact with the analytics server 110. The electronic client devices 120 may be any computing device comprising a processor and non-transitory machine-readable storage medium allowing the electronic client devices 120 to perform the various tasks and processes described herein. The examples of the computing device may include but are not limited to, a desktop computer, a laptop, a personal digital assistant (PDA), a smartphone, a tablet computer, and the like.

The electronic client device 120 may execute an Internet browser or local application that accesses the webserver 130 in order to issue requests or instructions received and satisfied by the analytics server 110. The electronic client device 120 may transmit credentials from client inputs to the analytics server 110, from which the analytics server 110 may use to authenticate the client and/or determine a client role. The electronic client device 120 may comprise any number of input devices configured to receive any number of data inputs, including various types of data inputs allowing for authentication (e.g., username, passwords, certificates, and biometrics).

The analytics server 110 may be any computing device comprising a processor and non-transitory machine-readable storage capable of executing the various tasks and processes described herein. The analytics server 110 may employ various processors such as central processing units (CPU) and graphics processing unit (GPU), among others. Non-limiting examples of such computing devices may include workstation computers, laptop computers, server computers, and the like. While the system 100 includes a single analytics server 110, the analytics server 110 may include any number of computing devices operating in a distributed computing environment, such as a cloud environment.

The analytics server 110 may be any computing device comprising a processor or any other computing hardware and software components, configured to host content, such as a website or any other platform. A website is a collection of related web pages, including multimedia content, typically identified with a common domain name, and published on at least one web server. A website may be accessible via one or more networks (e.g., network 140) including a public Internet Protocol (IP) network, such as the Internet. The analytics server 110 may also comprise software that runs on the computing device that retrieves and delivers the web pages in response to requests from the electronic client device 120. Web pages are documents, typically composed in plain text interspersed with formatting instructions of Hyper Text Markup Language (HTML, XHTML). The analytics server 110 may transport the web pages with Hypertext Transfer Protocol (HTTP), which may optionally employ encryption (HTTP Secure, HTTPS) to provide security and privacy for the user. Web pages can be viewed or otherwise accessed from a range of computer-based and Internet-enabled electronic devices of various sizes, including desktop computers, laptops, PDAs, and cell phones. Using one or more input elements of the websites (or other platforms hosted by the analytics server 110) users (via the electronic client devices 120) can submit an electronic request, such as upload documents or request documents to be made.

The databases 150 may be any non-transitory machine-readable media configured to store data. Specifically, the databases 150 may store various data needed to satisfy a user's electronic request received via the electronic client devices 120. In some embodiments (e.g., database 150a and 150c) one or more databases within the databases 150 may be in communication with one or more other servers (e.g., servers 170a and 170b). These servers may be configured to communicate only with the respective database and further configured to manage the storage of various data needed to process various requests. For instance, the server 170a may be configured to perform natural language processing based on data that is stored within the database 150a.

Each database may also include a communication interface (communication interfaces (C/I) 160). As used herein, communication interfaces 160 may refer to any protocol (hardware or software using a communication standard) that enables one or more databases within the databases 150 (or a respective server in communication with the database) to telecommunicate with the analytics server or any other computing feature discussed herein. A non-limiting example of a communication interface is an application programming interface (API). An API may refer to any software intermediary that allows two applications to communicate with each other.

Figure 1B:
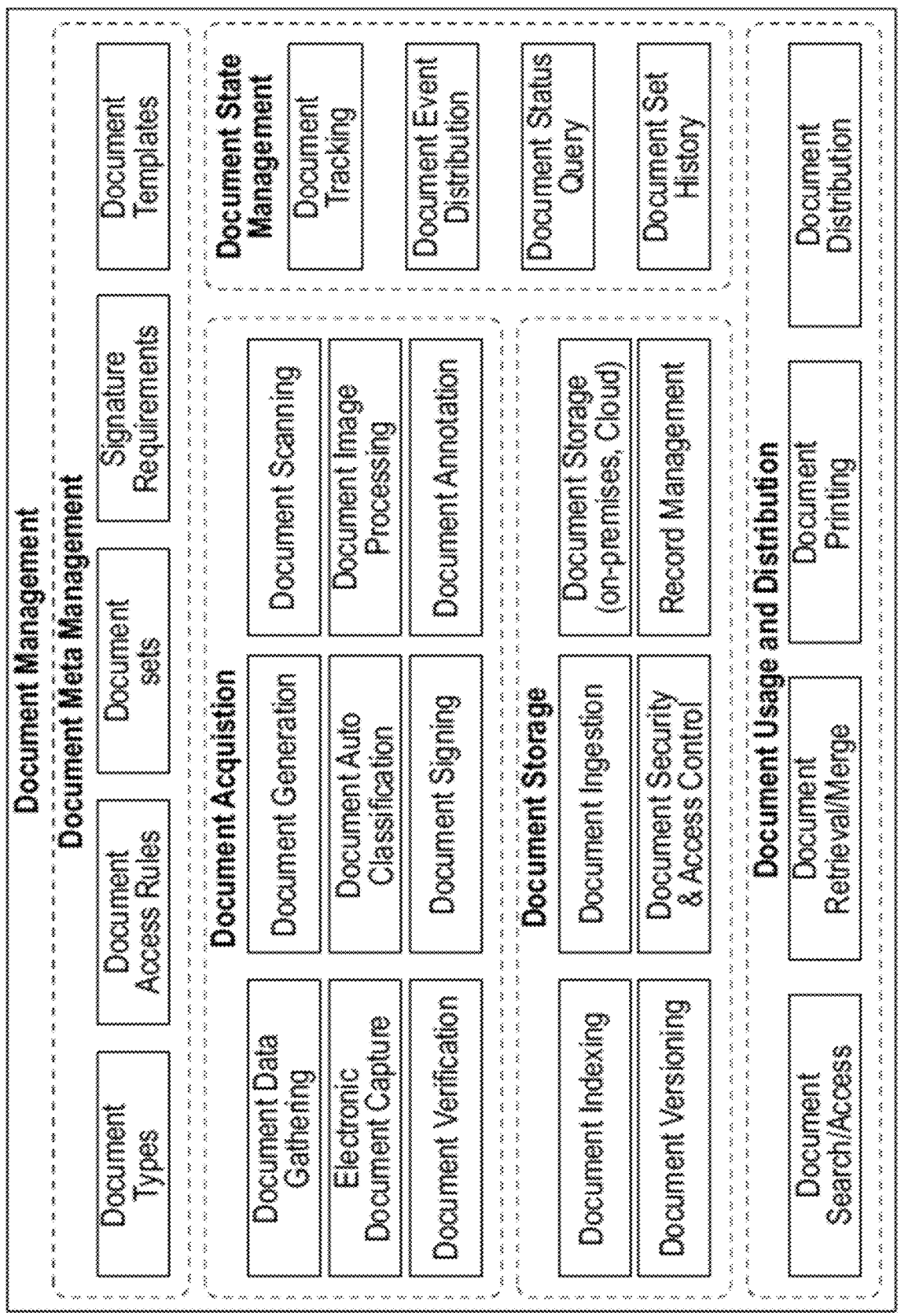
FIG. 1B illustrates examples of document management components, according to an embodiment.

Each database (and its corresponding server) may be configured to perform analytical function and store the results. In an embodiment, one or more of the databases within the databases 150 may be related to document management services. Document management may be a key enabler of any entity's drive towards improved customer experience and reduced operational costs. In addition, the ability for both customers and employees to "go paperless" allows for shorter cycle times, and increased productivity and security/auditability. The system 100 may represent a document management eco-system. Accordingly, the databases 150 (and their corresponding servers and communication interfaces) may analyze various documents and provide various insights and needed analysis, such that a request of the user can be satisfied. Non-limiting examples of document management analytical functions are depicted in FIG. 1B. In some embodiments, each database may communicate with one or more servers and be configured to store a specific function depicted in FIG. 1B. For instance, the database 150a may store the results of document indexing (depicted in FIG. 1B) that is performed via the server 170a. FIG. 1B represents the logical capabilities in the domain (or scope) of the Document Management capabilities.

Figure 1C:
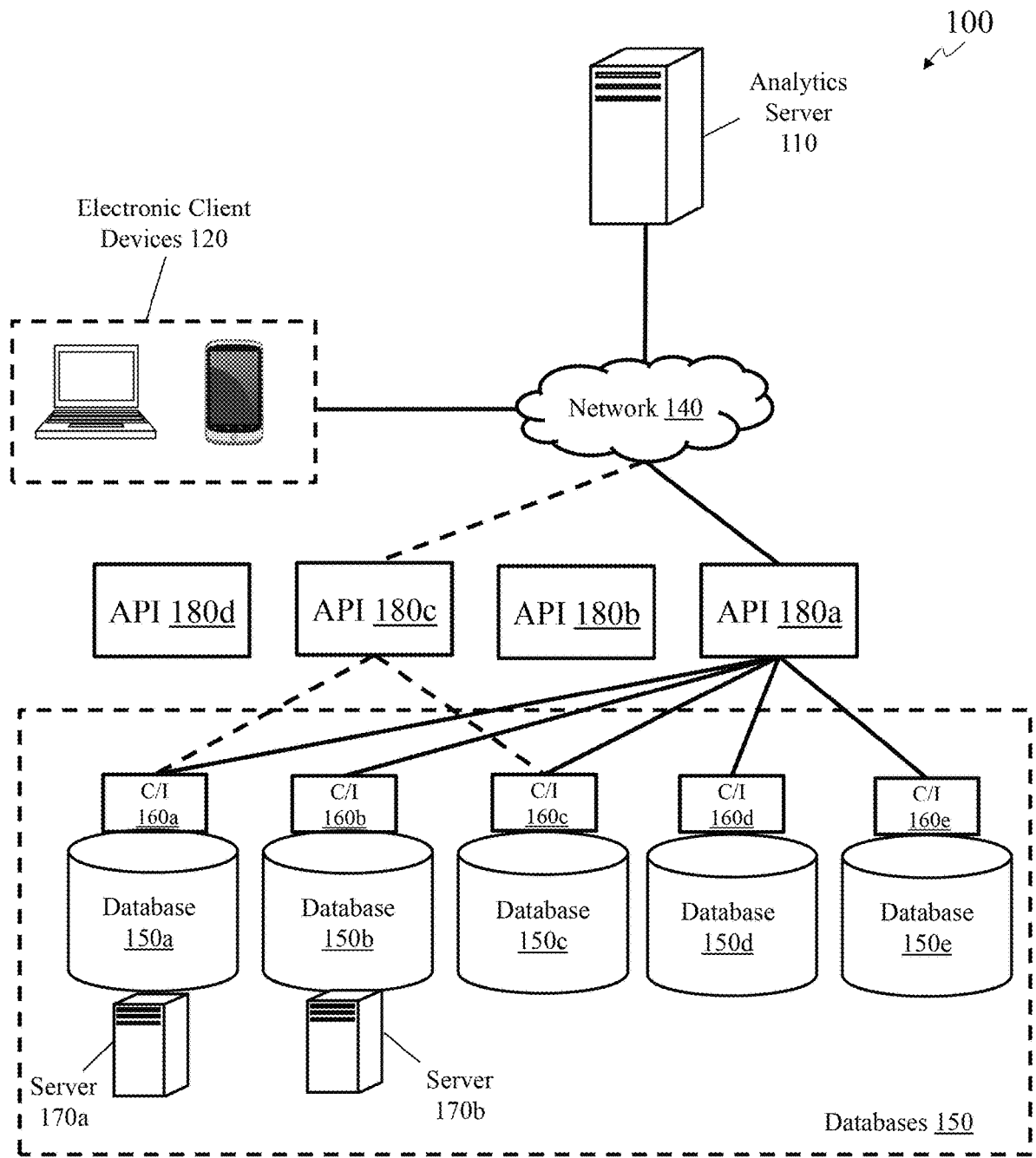
FIG. 1C illustrates a computer system for a dynamic generation of electronic documents, according to an embodiment.

In operation, and referring now to FIG. 1C, the analytics server 110 may receive an electronic request from a user operating the electronic client devices 120. The analytics server 110 may then identify various analytical functions needed to satisfy the request. The analytics server 110 may then generate a dynamic pipeline of computer-executable commands configured to instruct various communication interfaces to retrieve data (in accordance with specific instructions of the analytics server 110 within the dynamic pipeline). As a result, the analytics server 110 may configure the API 180a. The machine-readable instructions may be modular, such that the API 180a can segment different computer-executable code modules within the machine-readable instructions and communicate with different communication interfaces 160. The API 180a may then instruct different databases 150 and/or their corresponding servers to execute various functions (e.g., retrieve and/or analyze data) included within different modules of the machine-readable instructions. After the execution of the machine-readable instructions by different servers/databases, the API 180a may then transmit the results back to the analytics server 110. In this way, the analytics server 110 may only communicate with the API 180a and not different communication interfaces 160.

In some configurations, the analytics server may generate various APIs (e.g., APIs 180b-d) where each API is pre-configured for a different type of electronic request. Therefore, while in this non-limiting example, the analytics server 110 configures the API 180a for the electronic request received, in other examples, the analytics server 110 may use pre-configured APIs 180b-d. For instance, the API 180c may be used for requests that only need data to be retrieved and analyzed by the databases 150a and 150c.

Figure 2:
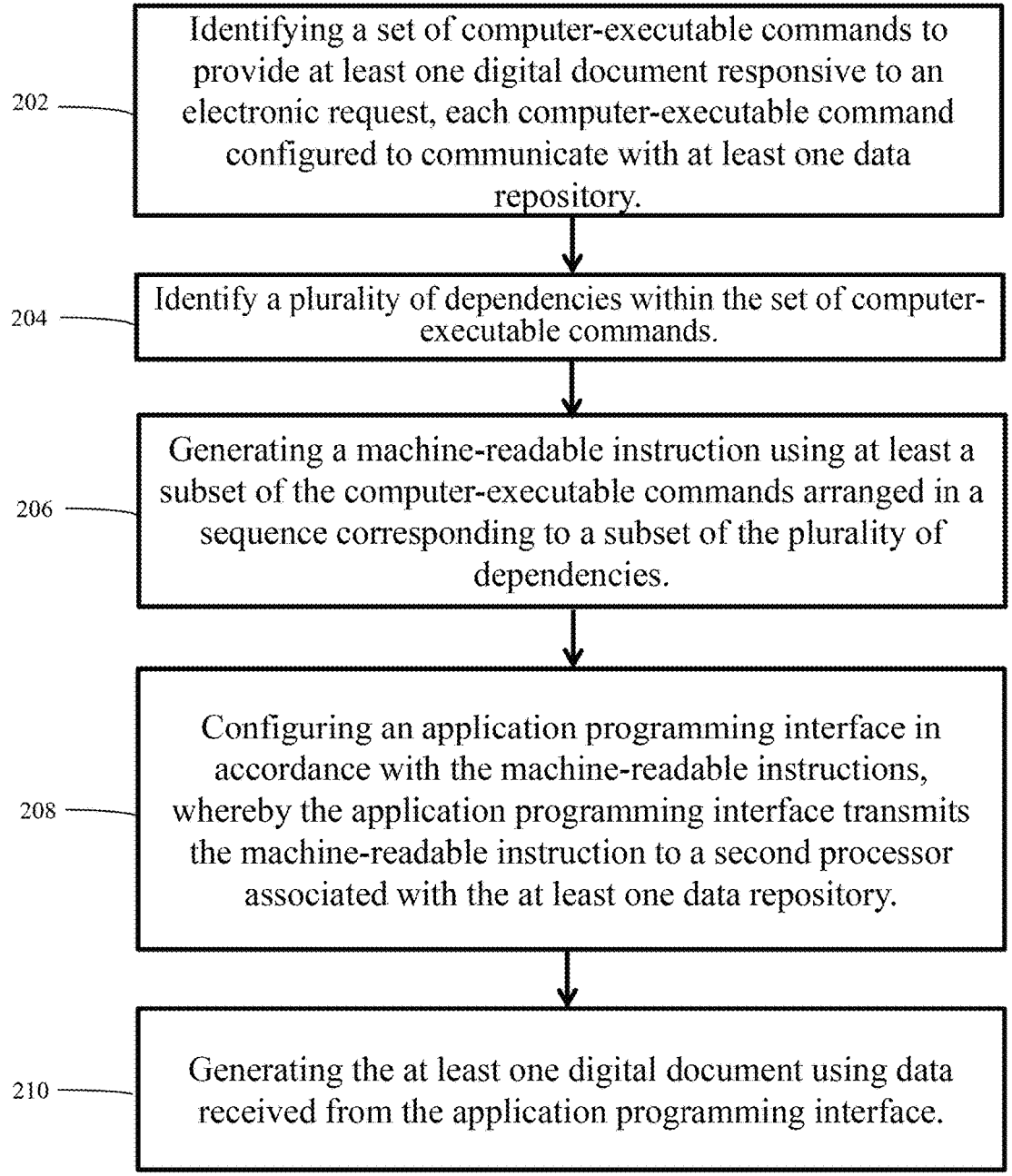
FIG. 2 illustrates a flowchart depicting operational steps executed in a dynamic generation of electronic documents system, according to an embodiment.

FIG. 2 illustrates the execution of a method 200 for dynamic generation of electronic documents, according to an embodiment. Other embodiments may comprise additional or alternative steps or may omit some steps altogether. Even though certain aspects of the embodiments described herein are described to be performed by an analytics server (e.g., similar to the analytics server described in FIG. 1), in some embodiments, the functionality described herein may be performed by different servers or computing devices discussed herein. For instance, a portion of the tasks described in the method 200 may be performed by a user device and another portion may be performed by the analytics server.

At step 202, the analytics server may identify a set of computer-executable commands to provide at least one digital document responsive to an electronic request, each computer-executable command configured to communicate with at least one data repository. As used herein, an electronic request may be any request initiated by a user which can be satisfied by the analytics server using various data retrieved by the analytics server from disparate data sources (e.g., the databases 150 described in FIG. 1). For instance, an electronic request may refer to a request to generate a specific document, such as an invoice. The invoice may be required to include various data, such as the number of items purchased, price per item, the total amount owed, the purchaser's information, and the like. In some other embodiments, an electronic request may not directly require an electronic document to be created or analyzed. For instance, an electronic request may include payment information needed to facilitate payment of an invoice. The electronic request may reference the invoice, such that the analytics server must identify information associated with the invoice such as the total amount needed to facilitate the payment. In some embodiments, the electronic request may include an image of the invoice in which the analytics server may be required to analyze the inputted image to identify information needed to facilitate the payment.

The analytics server may identify a set of computer-executable commands that correspond to the electronic request received. Each electronic request may include attributes of the request. The analytics server may use these attributes to identify the set of computer-executable commands. As used herein, the computer-executable command may refer to any action or function needed to be performed by the analytics server or any other computer processor in order to satisfy the electronic request. For instance, a computer-executable command may refer to an optical character recognition (OCR) function executed by the analytics server or under the instructions of the analytics server.

The computer-executable command may correspond to one or more attributes of the electronic request. The analytics server may query a database or a lookup data table to identify the set of computable-executable commands using attributes of the electronic request received. For instance, if an electronic request is a request to generate a bank statement, the analytics server may determine the following set of computer-executable commands: identifying an account associated with the user, retrieving a balance associated with the identified account, and creating an electronic document using a template (that corresponds to bank statements) that includes the retrieved balance.

At step 204, the analytics server may identify a plurality of dependencies within the set of computer-executable commands. After identifying the set of computer-executable commands, as described in step 202, the analytics server may determine a hierarchy or dependencies among the computer-executable commands. A hierarchy or a dependency, as used herein, may refer to an organization of computer-executable commands in accordance with their input, outputs, or other functionalities. For instance, a first computer-executable command may require an input that is generated as a result of the execution of a second computer-executable command. In another example, a first computer-executable command may be required to be executed at a time after the execution of a second computer-executable command.

In order to identify the dependencies within the set of computer-executable commands, the analytics server may query a lookup data table where dependencies and hierarchies are identified. For instance, a pre-stored hierarchy of computer-executable commands may indicate pre-identified and defined dependencies among different commands. Additionally or alternatively, each computer-executable command may itself include data (e.g. metadata) that may indicate any possible dependencies or pre-requisites needed for the computer-executable command to be executed. For instance, a first computer-executable command may indicate that it cannot be executed unless and until a second computer-executable command has been executed because the first computer-executable command uses the results of execution of the second computer-executable command.

Figure 3:
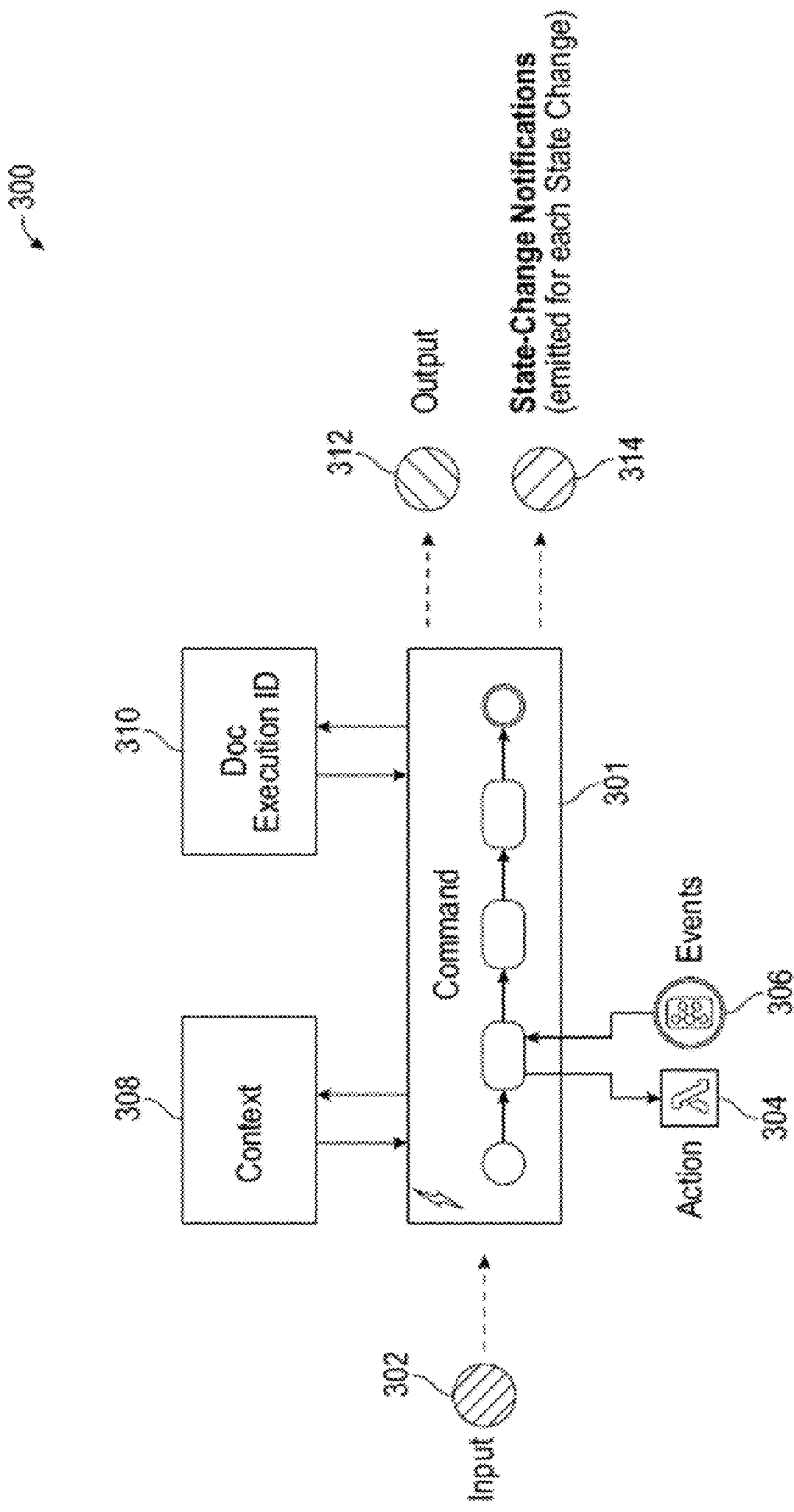
FIGS. 3-5 illustrate visual depictions of different computer-executable commands, in accordance with different embodiments.

Referring now to FIG. 3, a visual representation of a computer-executable command 300 is illustrated, in accordance with an embodiment. The computer-executable command 300 may be reusable. Specifically, the computer-executable command 300 may be defined as a finite state machine (e.g., implemented using a function, such as step functions, where each instance of the command may perform the same step). As depicted, the computer-executable command 300 may include multiple steps (three steps represented within the box 301). The computer-executable command 300 may indicate data associated with the input 302. The input 302 may indicate data associated with what the computer-executable command 300 requires to receive in order to generate the output 312. For instance, the input 302 and output 312 may include what data is received and what data is produced as a result of the execution of the computer-executable command 300.

The computer-executable command 300 may also indicate the context 308 indicating the context associated with the data analyzed by the computer-executable command 300. For instance, the context 308 may indicate that the data used by the computer-executable command 300 may be structured JSON-based state storage.

The computer-executable command 300 may also include a document execution ID 310 that identifies what type of data/document is created as a result of the execution of the computer-executable command 300. For instance, the document execution ID 310 indicates that the computer-executable command 300 provides temporary working space to store files, metadata, and any other data for the duration of its execution.

The computer-executable command 300 may also indicate actions 304 and events 306 for one or more steps of the computer-executable command 300. Actions 304 and events 306 indicate what actions are performed, which resources are used, and what incoming events are needed for the computer-executable command 300 to be executed. The computer-executable command 300 may also include the state-change notification 314, which indicates what changes can be made as a result of the execution of the computer-executable command 300.

In some embodiments, the computer-executable command 300 (e.g., the output 312 and/or the input 302) may indicate a data lineage, hierarchy, or dependency. For instance, the input 302 may indicate or include a list of commands that must be executed as a prerequisite to the computer-executable command 300.

Figure 4:
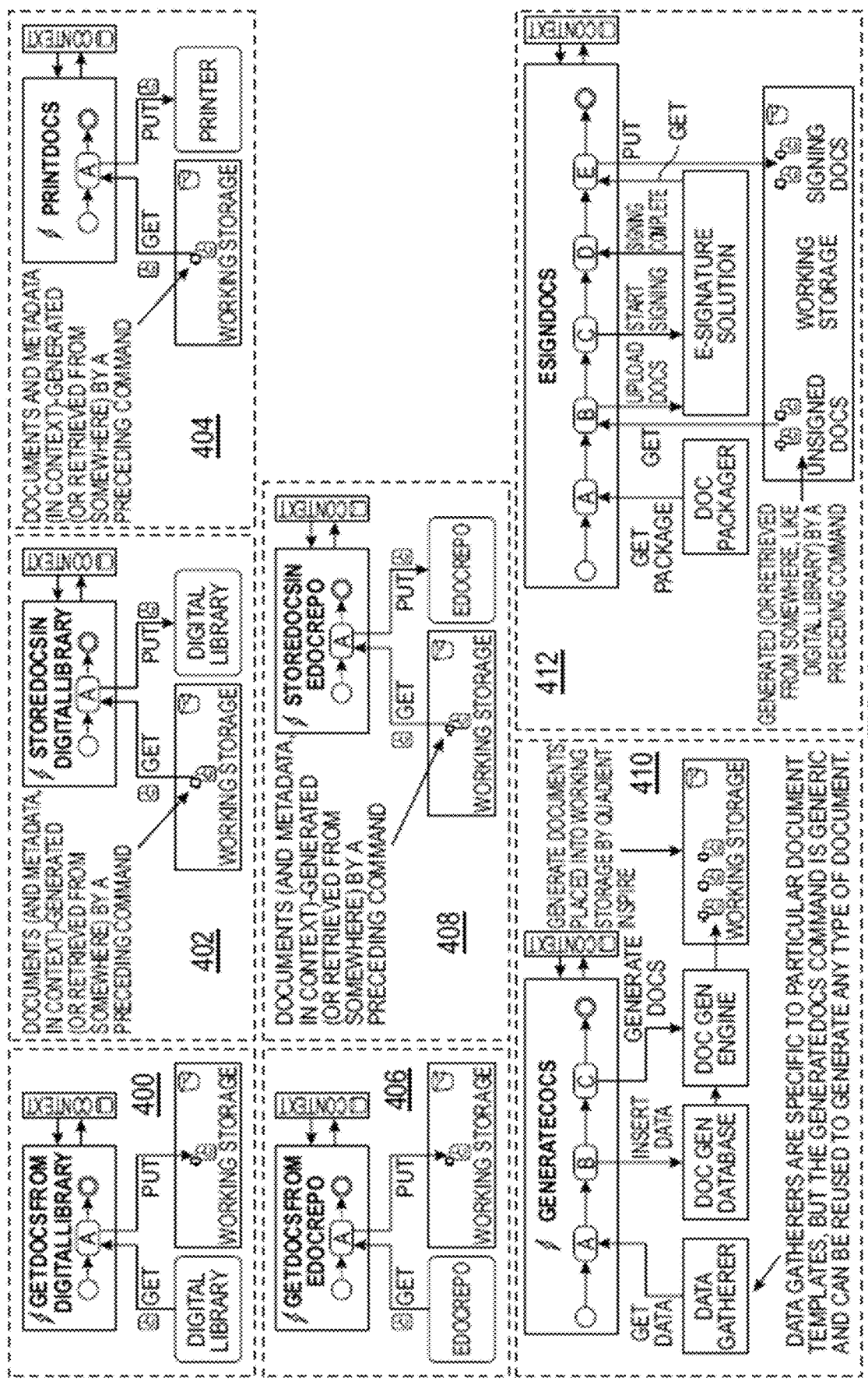

In some embodiments, the computer-executable commands may include a single step and may be reusable for a single purpose. Referring now to FIG. 4, non-limiting examples of different computer-executable commands are illustrated. For instance, the computer-executable command 400 may include a single step that retrieves an electronic document from a particular data repository (e.g., a digital library), performs the function "A," and stores the electronic document in a working storage. The computer-executable command 400 may have a name that describes its functionality (e.g., in natural language understandable to humans). For example, the computer-executable command 400 may be called "GetDocsFromDigitalLibrary," which may indicate that the computer-executable command 400 is configured to retrieve documents from a particular digital library. Users may call different commands when generating a machine-readable instruction.

Similarly, a computer-executable command 402 (named "StoreDocsInDigitalLibrary") may indicate a single step in which a document is stored in a particular data repository. Another computer-executable command 404 (name "PrintDocs") may indicate where a particular file is retrieved from and to which printer it is transmitted (along with instructions to print). Another computer-executable command 406 (named "GetDocsFromeDocRepo") may indicate a different command with which an electronic document is received or retrieved from a different data repository (e.g., eDocRepo). Another computer-executable command 408 (named "StoreDocsineDocRepo") may indicate where data is stored.

Certain computer-executable commands may have different steps that may include different computer-executable commands themselves. For instance, the computer-executable command 410 may include a command A that corresponds to gathering data (e.g., gathering a particular template to be filled), command B that corresponds to revising the template (e.g., inserting data into the retrieved template), and command C that corresponds to generating a document in accordance with the field template. The computer-executable command 410 may also indicate a working storage associated with the generated document. In another example, a computer-executable command 412 (named "eSignDocs") may include steps associated with receiving electronic signatures associated with the document.

Figure 5:
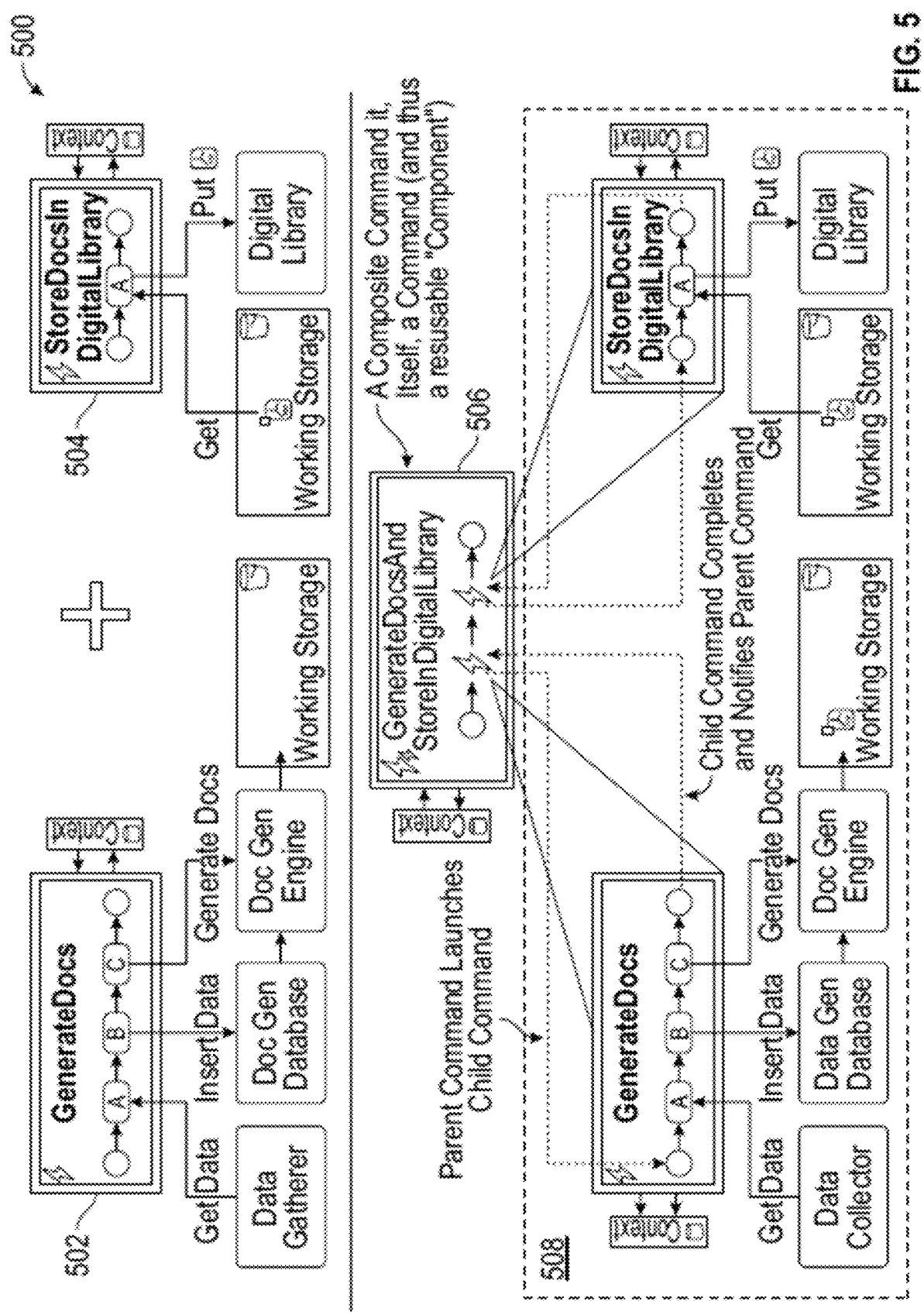

As discussed herein, each computer-executable command may be reusable for different requests (e.g., different inputs to produce different outputs). Therefore, different computer-executable commands may be used in conjunction with other computer-executable commands. Furthermore, different computer-executable commands may be combined to create a single command with a combined functionality of the underlying computer-executable commands having multiple steps that correspond to the underlying computer-executable commands. Referring now to FIG. 5, an example 500 provides a visual representation of combining a computer-executable command 502 and a computer-executable command 504, in accordance with an embodiment. The computer-executable command 502 may correspond to the computer-executable command 410 depicted in FIG. 4. The computer-executable command 504 may correspond to the computer-executable command 402, depicted in FIG. 4. A computer-executable command 506 may include two steps where each step corresponds to different computer-executable commands. For instance, a first step of the computer-executable command 506 may correspond to the computer-executable command 502 and a second step of the computer-executable command 506 may correspond to the computer-executable command 504.

Referring back to FIG. 2, in step 206, the analytics server may generate a machine-readable instruction using at least a subset of the computer-executable commands arranged in a sequence corresponding to a subset of the plurality of dependencies. The analytics server may generate a machine-readable instruction corresponding to at least a subset of the computer-executable commands (e.g., computer-executable commands described in the step 202) in accordance with at least one dependency (e.g., identified in the step 204). The analytics server may generate machine-readable instructions corresponding to the commands needed to satisfy the electronic requests. The machine-readable instructions may create a pipeline of inputs and outputs that can be used to satisfy the electronic request.

The machine-readable instructions may arrange different modules in sequence, such that computer-executable commands are executed and the order of each computer-executable command. The sequence in which different modules of the machine-readable instructions are arranged may correspond to the dependencies identified in the step 204. For instance, the sequence may correspond to the input and output dependencies indicated by each computer-executable command. The machine-readable instruction may include multiple modules where each module may correspond to a particular computer-executable command. Different modules may be executed synchronously or asynchronously depending on the instructions themselves. For instance, a module may be triggered by the execution of an event and/or another module.

In another example, the modules may be arranged sequentially or in as a daisy chain of modules. For instance, various modules of the machine-readable instructions can be arranged, such that an output of one module (and its corresponding computer-executable command) can be ingested by another module (and its corresponding computer-executable command) as its input. Therefore, different modules may be linked together creating a chain of commands.

In another embodiment, two or more modules may be executed in parallel. For instance, two or more modules can be executed at the same time (or substantially the same time) via two different processors and/or using different data repositories. Executing modules in parallel may create efficiencies, such as decreasing execution time.

Figure 6:
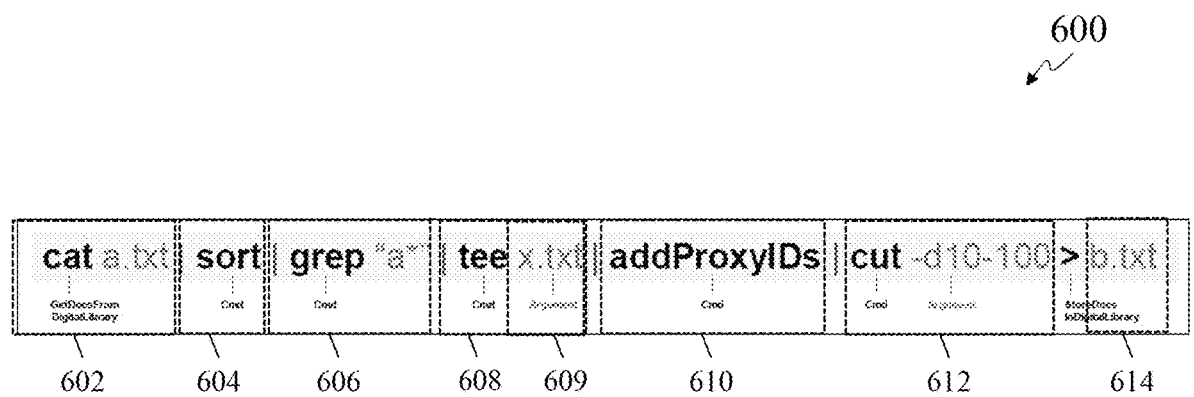
FIGS. 6-7 illustrate visual depictions of machine-readable instructions, in accordance with an embodiment.

Referring now to FIG. 6, a machine-readable instruction 600 indicates a set of computer-executable commands and their dependencies. The machine-readable instruction 600 includes modules 602-614. When a processor receives the machine-readable instruction 600, the processor may execute the computer-executable commands corresponding to each of the modules 602-614 in that order (e.g., left to right or any other order designed by the analytics server or the machine-readable instruction 600). Each computer-executable command within each module may be called using its command name. For instance, the machine-readable instruction 600 may instruct the processor to execute a "GetDocsFromaDigitalLibrary" command (module 602). The machine-readable instruction 600 may include a module 604 that corresponds to a different computer-executable command (e.g., "Sort" command).

The machine-readable instructions may also include arguments needed to execute various computer-executable commands. An argument, as used herein, may refer to a value that is passed between programs, subroutines, or functions. Non-limiting examples of au argument may include independent items, or variables, that contain data or codes. The module 608 may include the argument 609 which indicates parameters needed (can be used) when executing computer-executable commands ("Tee").

The machine-readable instruction 600 is illustrated as a sequence of modules (and their corresponding computer-executable commands) in which the output of some of the modules is ingested as an input of at least one other module. For instance, the module 602 may include a "cat a txt." command that retrieves various electronic documents (e.g., text documents in ".txt" format) from a particular digital library (e.g., database or any other data repository). The next module, the module 604 includes a "sort" command in which the electronic documents retrieved via the module 602 are sorted in accordance with certain criteria. Therefore, the module 604 uses the output of the module 602 as its input.

In some embodiments, the machine-readable instructions may be generated in accordance with a selection of the set of computer-executable commands that are associated with the electronic request. For instance, not every computer-executable command (associated with an electronic request or identified in the step 202) may be used in the generation of the machine-readable instruction. The selection of computer-executable commands included within the machine-readable instruction may be received by the analytics server from a system administrator or an end-user. Additionally or alternatively, the selection may be retrieved from a pre-configured file or generated by a computer model.

In some embodiments, a user (e.g., a system administrator) may instruct the analytics server to generate the machine-readable instructions by selecting a group of computer-executable commands. For instance, the analytics server may present a graphical user interface (GUI) that includes various input elements allowing the user to identify the computer-executable commands to be included within the machine-readable instructions. That is, the user may generate and arrange different modules included within the machine-readable instructions. The GUI may also include input elements allowing the user to input an order or dependencies associated with the computer-executable commands.

Figure 7:
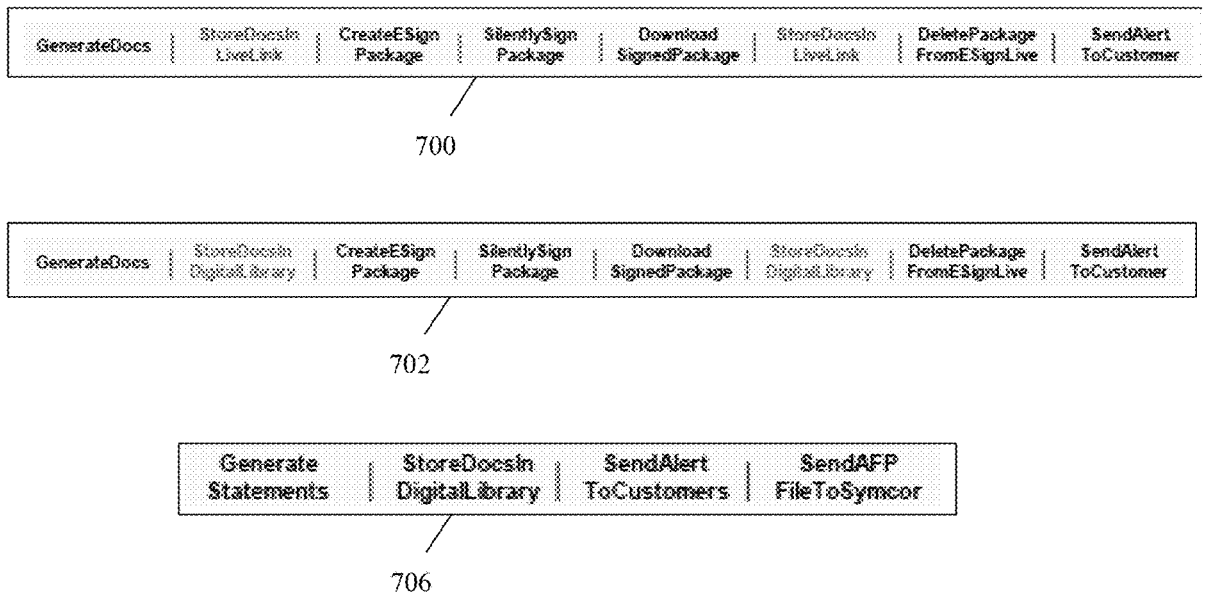

Referring now to FIG. 7, non-limiting examples of machine-readable instructions are illustrated. As discussed herein, each computer-executable command of different modules may also have a call name. As a result, users can easily construct different modules using the call names. For instance, machine-readable instructions 700-706 illustrate how a user may construct different modules using natural language. The analytics server may then generate the code corresponding to the machine-readable instructions 700-706.

Figure 8:
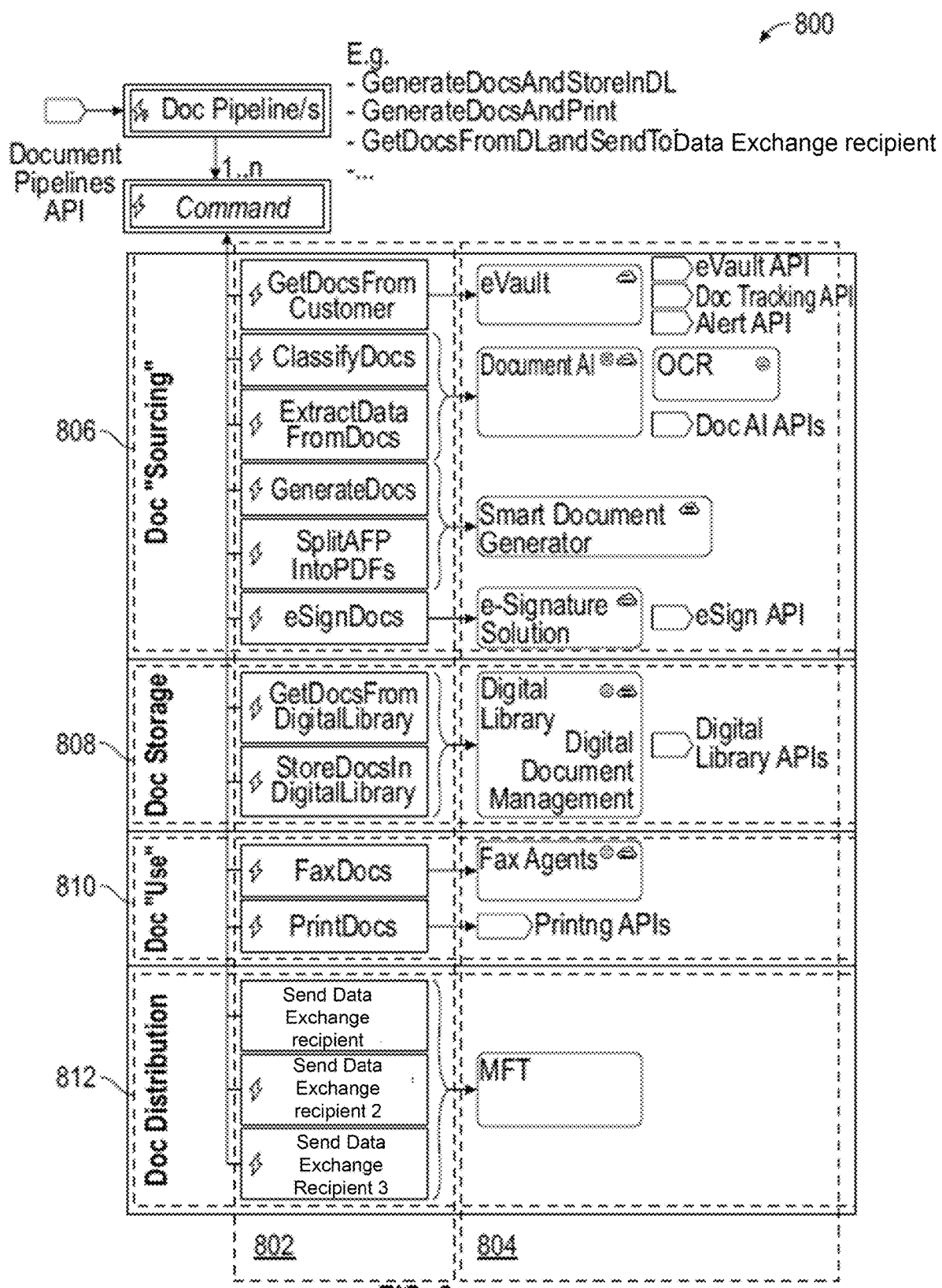

The analytics server may present a visual representation of different computer-executable commands, as depicted in FIG. 8. For instance, a GUI 800 may include graphical representations 802 where each graphical representation corresponds to a different computer-executable command. The graphical representations may be grouped in accordance with their respective functionalities. For instance, group 806 corresponds to document sourcing commands, group 808 corresponds to document storage commands, group 810 corresponds document user commands, and group 812 corresponds to document distribution commands.

The GUI 800 may also include graphical representations 804 identifying a set of data repositories that correspond to the set of commands (represented by the graphical representations 802). The analytics server may display a description of various computer-executable command (e.g., glossary 900 depicted in FIG. 9).

The analytics server may monitor various machine-readable instructions and their corresponding electronic requests. For instance, the analytics server may identify a list of electronic requests (and their corresponding attributes) and their corresponding machine-readable instructions. That is, the analytics server may determine how different electronic requests were satisfied. Using the monitored data, the analytics server may train a computer model, such that the computer model can uncover patterns indicating how different electronic requests were solved. For instance, the computer model may identify a pattern between attributes of the electronic request and attributes of the machine-readable instructions, such as which computer-executable commands were included in the machine-readable instructions, the order of commands included within the machine-readable instructions, and/or parameter and arguments included within the machine-readable instructions).

The computer model may use various methods to identify patterns between different electronic requests and their corresponding machine-readable instructions. For instance, the computer model may use a rule-based approach where various defined rules and thresholds indicate attributes of the machine-readable instructions, such as what computer-executable commands must be included within different modules of the machine-readable instructions. The rules may be previously inputted by a system administrator. In another example, the computer model may use various artificial intelligence and machine learning techniques to train itself to identify the patterns discussed herein, such as supervised, unsupervised, or semi-supervised methods. Once the computer model is trained, the computer model may ingest attributes of an electronic request and recommend/predict machine-readable instructions.

Generation of the machine-readable instructions may be performed automatically by the analytics server in a manner that is not visible to the user (or a system administrator) and without needing any inputs from a user (or a system administrator). Additionally or alternatively, the analytics server may present (e.g., on a GUI accessible to a user or a system administrator) the recommendation generated by the computer model, such that the user (or system administrator) can revise the recommended machine-readable instructions.

Referring back to FIG. 2, at step 208, the analytics server may configure an application programming interface in accordance with the machine-readable instructions, whereby the application programming interface transmits the machine-readable instruction to a second processor associated with the at least one data repository. The analytics server may generate a customized application programming interface that is configured to communicate with different processors, databases, computers, and other features to retrieve and analyze the data. The application programming interface may then instruct one or more processors to execute the computer-executable commands included in the machine-readable instructions. For instance, the application programming interface may execute different modules of the machine-readable instruction using the parameters included/provided (e.g., within the machine-readable instructions) by communicating with different databases and/or processors. Therefore, instead of conventional methods where multiple application programming interfaces were used to communicate with multiple data sources, the method 200 allows the analytics server to communicate with a single application programming interface, which allows for faster data processing and requires less computing power.

Additionally or alternatively, the analytics server may pre-configure a set of application programming interfaces for different electronic requests. For instance, the analytics server may preconfigure various application programming interfaces each corresponding to different sets of machine-readable instructions. That is, the analytics server may configure different application programming interfaces for different electronic requests. When the analytics server receives an electronic request, the analytics server may identify one or more appropriate application programming interfaces and utilize them to satisfy the electronic request.

At step 210, the analytics server may generate the at least one digital document using data received from the application programming interface. Using the dynamically configured application programming interface, the analytics server may receive the data needed to satisfy the electronic request. For instance, the application programming interface may retrieve and/or analyze data in accordance with different modules of the machine-readable instructions. For instance, using different modules of the machine-readable instructions, the application programming interface may retrieve the data needed to generate the electronic document corresponding to the request received. For instance, the application programming interface may retrieve data needed to identify the data to be included in a bank statement, such as account number, account balance, and the like. Then the analytics server may use the retrieved and generate the bank statement itself that includes the account number and account balance.

In some embodiments, the application programming interface itself may be configured to generate the electronic document. Therefore, the generation of the electronic document may be performed by the application programming interface under the direction of the analytics server. Specifically, one or more modules of the machine-readable instructions may include computer-executable commands that instruct one or more processors (e.g., the application programming interface or another server) to generate the electronic document.

Figure 10:
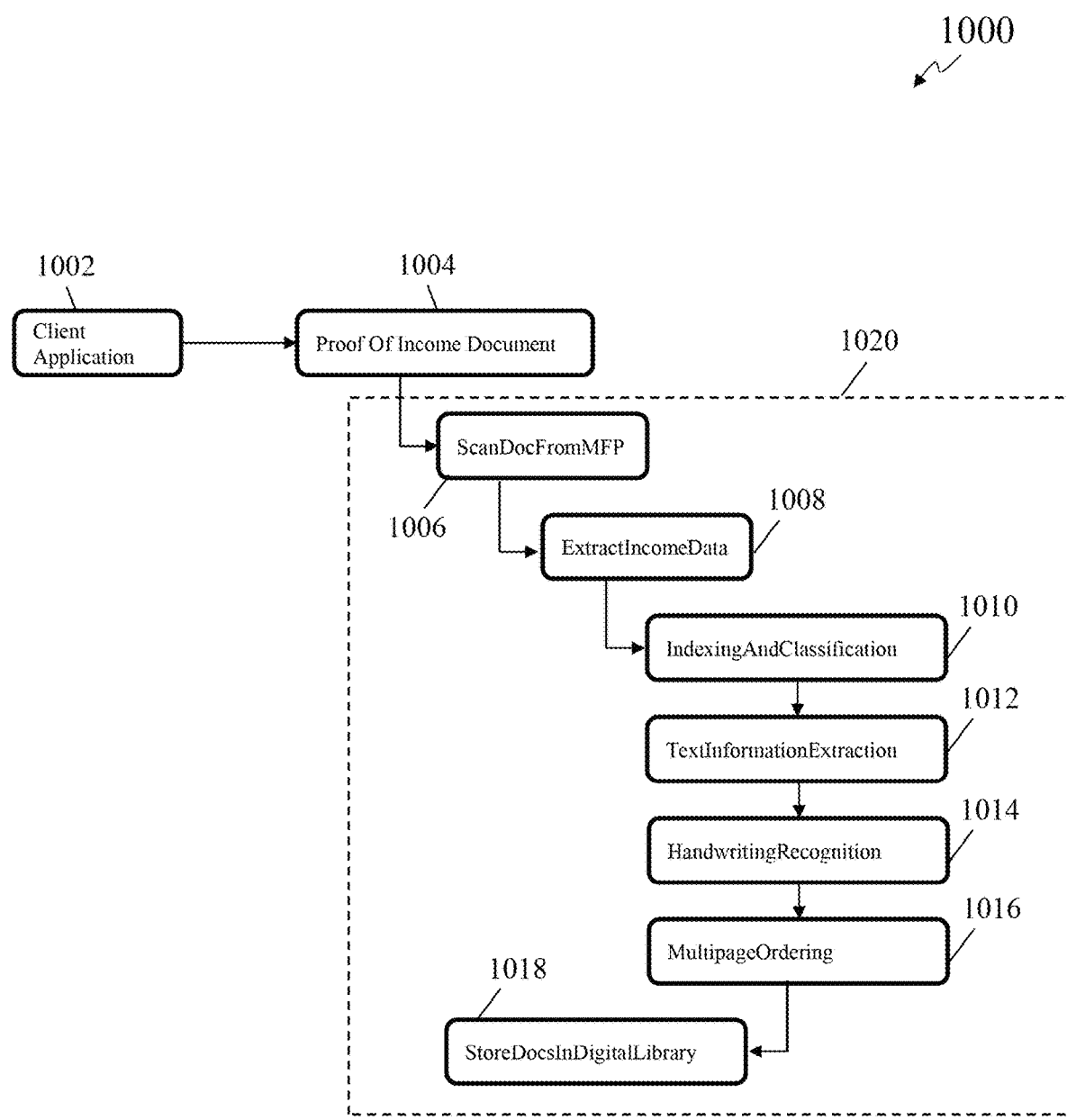
FIG. 10 illustrates operational steps executed in a dynamic generation of electronic documents system, according to an embodiment.

In a non-limiting example, as illustrated in FIG. 10, the analytics server generates a machine-readable instruction and configures an application programming interface that corresponds to an electronic request received from a user. In this non-limiting example, a user is filling out an application, which requires proof of income. Therefore, the user issues an electronic request to the analytics server to generate an electronic document that includes their income (proof of income).

The user may access a client application (1002) by initiating the application (e.g., a mobile application on a mobile phone) or accessing a website associated with the analytics server. Using the application, the user may issue an electronic request for the generation of proof of income document (1004). The analytics server may analyze attributes of the request (request to generate a proof of income document) and identify various functions that need to be performed to generate a document including proof of income for the user. The collection of computer-executable commands 1020 represents a collection of functions/commands that need to be performed in order to generate the proof of income document.

The collection of computer-executable commands 1020 starts with scanning a document from the multifunction peripheral (MFP) as depicted by the computer-executable command 1006. It then applies a set of machine learning based processing to identify and extract income information from the scanned document. Specifically, the computer-executable command 1008 uses a machine learning model to extract income data. The computer-executable command 1008 may include four different computer-executable commands 1010-1016. Using these commands, a processor may extract the data (handwritten or otherwise), order the extracted data, and index the extracted data). The collection of computer-executable commands 1020 may also include the computer-executable command 1018 which uses a processor to store the document along with the income information extracted and indexed (e.g., as metadata) into a digital library. The computer-executable commands 1020 may also indicate the order and sequence with which the commands may be executed. For instance, the computer-executable command 1012 may be executed before the computer-executable command 1014 and/or 1016.

The analytics server may generate a machine-readable instruction that corresponds to the collection of computer-executable commands 1020. The machine-readable instruction may correspond to the sequence/order shown in the collection of computer-executable commands 1020. The analytics server may then configure an application programming interface to execute the computer-executable commands within the collection of computer-executable commands 1020.

In some embodiments, the machine-readable instructions may be pre-generated. For instance, when the user requests the generation of a proof of income document, the analytics server retrieves a previously made machine-readable instruction that corresponds to the collection of computer-executable commands 1020. Using the retrieved machine-readable instruction, the analytics server may configure an application programing interface.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate the transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for dynamic generation of digital documents, the method comprising:
    identifying, by a processor, a set of computer-executable commands to provide at least one digital document responsive to an electronic request, each computer-executable command configured to communicate with at least one data repository;
    identifying, by the processor, a plurality of dependencies within the set of computer-executable commands;
    generating, by the processor, a machine-readable instruction using at least a subset of the computer-executable commands arranged in a sequence corresponding to a subset of the plurality of dependencies;
    dynamically configuring, by the processor, an application programming interface in accordance with the machine-readable instruction, whereby the application programming interface transmits the subset of computer-executable commands in accordance with the sequence to a plurality of second processors each associated with the at least one data repository; and
    generating, by the processor, the at least one digital document using data received from the application programming interface.

2. The method of claim 1, wherein the subset of the computer-executable commands are arranged synchronously or asynchronously.

3. The method of claim 1, further comprising:
    presenting, by the processor, a graphical user interface displaying an indication of at last one computer-executable command.

4. The method of claim 3, wherein the graphical use interface comprises at least one input element configured to receive a revision to the machine-readable instruction or the computer-executable command.

5. The method of claim 4, wherein the revision corresponds to at least one dependency or the sequence.

6. The method of claim 1, further comprising:
    training, by the processor, a computer model to identify an attribute of the machine-readable instruction.

7. The method of claim 1, wherein the subset of the computer-executable commands are arranged, such that an output of a first computer-executable command of the subset of the computer-executable commands is an input to a second computer-executable command of the subset of the computer-executable command.

8. A computer system for dynamic generation of digital documents, the computer system comprising:
    a server comprising a processor and a non-transitory computer-readable medium containing instructions that when executed by the processor causes the processor to perform operations comprising:
        identifying a set of computer-executable commands to provide at least one digital document responsive to an electronic request, each computer-executable command configured to communicate with at least one data repository;
        identifying a plurality of dependencies within the set of computer-executable commands;
        generating a machine-readable instruction using at least a subset of the computer-executable commands arranged in a sequence corresponding to a subset of the plurality of dependencies;
        dynamically configuring an application programming interface in accordance with the machine-readable instruction, whereby the application programming interface transmits the subset of computer-executable commands in accordance with the sequence to a plurality of second processors each associated with the at least one data repository; and generating the at least one digital document using data received from the application programming interface.

9. The system of claim 8, wherein the subset of the computer-executable commands are arranged synchronously or asynchronously.

10. The system of claim 8, wherein the instruction further causes the processor to present a graphical user interface displaying an indication of at last one computer-executable command.

11. The system of claim 10, wherein the graphical use interface comprises at least one input element configured to receive a revision to the machine-readable instruction or the computer-executable command.

12. The system of claim 11, wherein the revision corresponds to at least one dependency or the sequence.

13. The system of claim 8, wherein the instruction further causes the processor to train a computer model to identify an attribute of the machine-readable instruction.

14. The system of claim 8, wherein the subset of the computer-executable commands are arranged, such that an output of a first computer-executable command of the subset of the computer-executable commands is an input to a second computer-executable command of the subset of the computer-executable command.

15. A computer system for dynamic generation of digital documents, the computer system comprising:
   a server having at least one processor, the server configured to:
      identifying a set of computer-executable commands to provide at least one digital document responsive to an electronic request, each computer-executable command configured to communicate with at least one data repository;
      identifying a plurality of dependencies within the set of computer-executable commands;
      generating a machine-readable instruction using at least a subset of the computer-executable commands arranged in a sequence corresponding to a subset of the plurality of dependencies;
      dynamically configuring an application programming interface in accordance with the machine-readable instruction, whereby the application programming interface transmits the subset of computer-executable commands in accordance with the sequence to a plurality of second processors each associated with the at least one data repository; and
      generating the at least one digital document using data received from the application programming interface.

16. The computer system of claim 15, wherein the subset of the computer-executable commands are arranged synchronously or asynchronously.

17. The computer system of claim 15, wherein the server is further configured to present a graphical user interface displaying an indication of at last one computer-executable command.

18. The computer system of claim 17, wherein the graphical use interface comprises at least one input element configured to receive a revision to the machine-readable instruction or the computer-executable command.

19. The computer system of claim 18, wherein the revision corresponds to at least one dependency.

20. The computer system of claim 15, wherein the server is further configured to train a computer model to identify an attribute of the machine-readable instruction.

\* \* \* \* \*